(12) United States Patent
Dubrovskaya-Vinokurova et al.

(10) Patent No.: US 8,796,360 B2
(45) Date of Patent: Aug. 5, 2014

(54) EPOXY-RUBBER COMPOSITION FOR CURED MATERIALS

(75) Inventors: Galina Dubrovskaya-Vinokurova, Munich (DE); Ayaz Ahmadov, Baku, AZ (US)

(73) Assignee: Malaxit, Baku (AZ)

( * ) Notice: Subject to any disclaimer, the term of this patent is extended or adjusted under 35 U.S.C. 154(b) by 266 days.

(21) Appl. No.: 12/953,913

(22) Filed: Nov. 24, 2010

(65) Prior Publication Data

US 2012/0129979 A1   May 24, 2012

(51) Int. Cl.
| | |
|---|---|
| *C08L 63/00* | (2006.01) |
| *C08L 23/18* | (2006.01) |
| *C08G 59/42* | (2006.01) |
| *C08G 59/50* | (2006.01) |
| *C08G 59/62* | (2006.01) |
| *C08K 5/095* | (2006.01) |

(52) U.S. Cl.
CPC ........ *C08G 59/5026* (2013.01); *C08G 59/4253* (2013.01); *C08G 59/5033* (2013.01)
USPC ............ 523/400; 523/455; 523/456; 524/579

(58) Field of Classification Search
CPC ........ C08G 59/42; C08G 59/50; C08G 59/62; B08L 63/00; B08L 23/18; C08K 5/095
See application file for complete search history.

(56) References Cited

U.S. PATENT DOCUMENTS

| | | | |
|---|---|---|---|
| 3,926,903 A | | 12/1975 | Scola |
| 4,121,000 A | * | 10/1978 | Wald ............................ 428/35.7 |
| 4,749,738 A | | 6/1988 | Boutni |
| 4,789,599 A | * | 12/1988 | Nakamura et al. ......... 428/411.1 |
| 5,039,343 A | * | 8/1991 | Umeda et al. ................. 106/404 |
| 5,075,379 A | | 12/1991 | Storey et al. |
| 6,111,050 A | * | 8/2000 | Yamaguchi et al. ............ 528/68 |
| 6,174,928 B1 | * | 1/2001 | Mizuide et al. ................. 521/46 |
| 2006/0054053 A1 | * | 3/2006 | Masutani et al. ................. 106/2 |
| 2008/0008838 A1 | * | 1/2008 | Arpac et al. .................. 427/386 |
| 2009/0191419 A1 | * | 7/2009 | Yukawa et al. ............... 428/522 |

FOREIGN PATENT DOCUMENTS

| | | |
|---|---|---|
| CN | 1277225 | 12/2000 |
| JP | 8-218051 | 8/1996 |

OTHER PUBLICATIONS

Hexion Specialty Chemicals B.V., "HEXION Product Bullentin, Epikote Resins for Coating, Civil Engineering and Adhesive Applications," Printed Feb. 2009, pp. 1-6.*
I. Ryb'ev, N. Blank, O. Figovsky, Polymer conglomerates based on epoxy-rubber compositions, Building Materials, 1978, No. 6, pp. 26-27, Russia.

* cited by examiner

*Primary Examiner* — Randy Gulakowski
*Assistant Examiner* — Ha Nguyen
(74) *Attorney, Agent, or Firm* — Henry M Feiereisen, LLC

(57) ABSTRACT

The invention relates to an epoxy/rubber composition comprising an epoxy resin which comprises an epoxy compound X, the epoxy compound X has epoxy equivalent weight (EEW) from 150 up to 200 and viscosity from 2,000 up to 10,000 cps (25 C), a curing agent, a liquid rubber that is liquid at room temperature and comprises at least 1.5 reactive terminated group, a fluorine contained organic matter, selected from a group, including

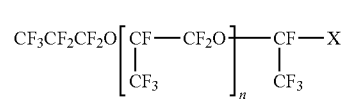

a)

where: n=1-20;
X=—COOH, —CONH$_2$, —CON(C$_6$H$_5$)$_2$, —CH$_2$OH.
b) CF$_3$(CF$_2$)$_n$COOH, where: n=7-9.

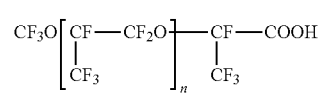

c)

where: n=3-20.

4 Claims, No Drawings

EPOXY-RUBBER COMPOSITION FOR CURED MATERIALS

FIELD OF THE INVENTION

The present invention relates on epoxy-rubber composition that can be used as matrix of all the kinds of composite materials such as coatings, reinforced and laminated plastics, sealants, adhesives, polymer concretes etc.

BACKGROUND OF THE INVENTION

The use of a variety of toughening agents to modify epoxy resins improves the fracture toughness of epoxy systems. Many factors affect the thermal and mechanical properties of such epoxy systems. Epoxy resins are defined as any molecules containing one or more 1,2 epoxy groups, mainly terminated, that can be converted to a thermoset form or a three-dimensional network structure. Depending on the chemical structure of the curing agents and on curing conditions, the properties of cured epoxy resins are versatile, including excellent chemical and heat resistance, high adhesive strength, low shrinkage, good impact resistance, high strength and hardness, and high electrical insulation. But cured epoxy systems have a main drawback: their considerable brittleness, which shows poor fracture toughness, poor resistance to crack propagation and low impact strength. This inherent brittleness has limited their application in fields required high impact and fracture strengths, such as reinforced plastics, matrix for composites and coatings.

Rubber-modified epoxy resins exhibit increased fracture toughness, but also show the deterioration of other important properties compared to the unmodified resin. As was shown in the article [I. Ryb'ev, N. Blank, O. Figovsky. Polymer conglomerates based on epoxy-rubber compositions. Building Materials, 1978, No. 6, pp. 26-27—in Russia] the properties of rubber-modified epoxy resins using as a matrix for anticorrosive composite materials depend not only from types of epoxy resins, liquid rubber and curing agent but also from heterogenic structures of these systems, that could be characterized by an integral indicator—a specific surface of phases division.

Depend of application conditions many patents described different epoxy-rubber composition. Epoxy resin adhesive composition is described in U.S. Pat. No. 4,749,738; it contains an epoxy compound and a reaction product of an aliphatic polyamine with a diene type liquid rubber having a terminal carboxyl group, which is valuable for bonding of FRP. Another composition is disclosed in U.S. Pat. No. 5,075,379 a curing agent for epoxy resins a rubber/diamine blend, more particularly, diaminoisopropylbenzene (DAIPB) modified with an amine terminated butadiene liquid rubber (ATBN). Epoxy adhesive composition is disclosed in Japan patent No. 8218051. This adhesive composition essentially comprises an epoxy resin, modified acrylonitrile-butadiene liquid rubber with terminated carboxyl groups and polyamic acid curing agent. Epoxy resin composition flexibilized with liquid and hydroxyl rubber is disclosed in Chinese patent No. 1277225. This composition is prepared with bisphenol A epoxy resin, organic tinphosphate, liquid rubber having terminated hydroxyl groups.

As a typical example of epoxy-rubber curable crack-resistant composition it is possible to see the composition according U.S. Pat. No. 3,926,903 filled on Sep. 30, 1974 comprises, in weight percent referring to the total weight of components (a) and (b): (a) 92-94% of a bicyclopentadiene ether epoxy resin, (b) 6-8% of a reactive elastomer selected from the group consisting of a functionally terminated butadiene homopolymer, a functionally terminated butadiene-acrylonitrile copolymer and a functionally terminated butadiene-styrene copolymer and c) an aromatic polyamine curing agent in an amount sufficient to provide 0.5-2.0 amino hydrogen atoms of the amine for each epoxy group.

SUMMARY OF THE INVENTION

This invention provides epoxy/rubber composition with improved mechanical characteristics.

To realize this invention, an embodiment is an epoxy resin composition for a cured material, comprising:
an epoxy resin comprising an epoxy compound X, the epoxy compound X has epoxy equivalent weight (EEW) from 150 up to 200 and viscosity from 2,000 up to 10,000 cps (25 C),
a curing agent,
a liquid rubber that is liquid at room temperature and comprises at least 1.5 reactive terminated group,
a fluorine contained organic matter, selected from a group, including

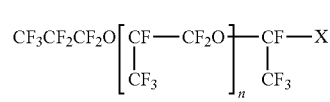

a)

where: n=1-20;
X=—COOH, —CONH$_2$, —CON(C$_6$H$_5$)$_2$, —CH$_2$OH.
b) CF$_3$(CF$_2$)$_n$COOH, where: n=7-9.

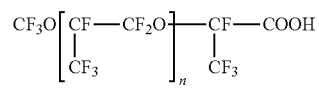

c)

where: n=3-20.

The composition according this invention comprises 0.1-1.0 parts of the above described fluorine contained organic matter to 100 parts of an epoxy compound by a ratio epoxy compound/liquid rubber 100/1.5-28. The composition according this invention can comprise additionally different additives and fillers according to application needs.

DETAILED DESCRIPTION OF THE INVENTION

The composition according the present invention comprises as an epoxy resin low molecular weight oligomers with at least two terminated epoxy groups such as glycidic ethers of bis-phenol A, bis-phenol F, other bis-phenols, alkylresorcinols, novolac low molecular resins, acrylic low molecular resins, etc, with their mixtures with aliphatic glycidic ethers. The epoxy resin should have epoxy equivalent weight (EEW) from 150 up to 220 and viscosity from 2,000 up to 10,000 cps (25 C), The composition according the present invention comprises as a liquid rubber low molecular weight linear carbon- or hetero-chain liquid at room temperature rubbers, such butadiene, butadiene-arcylonitril, butadiene-styrene, butadiene-isoprene, chlorisoprene, acrylic and silicone oligomers with terminated reactive able carboxyl, hydroxyl, amine and epoxy groups.

The composition according the present inventions comprises as an hardener primary amines with at least two terminates primary amine groups, Manish basic, organic or element-organic matter with at least two terminated carboxylic acid anhydrate groups.

The curing agents can be combined with curing accelerators in order to increase their curing activity.

The composition according the present inventions comprises a fluorine contained organic matter in which the surface loss energy in an organic solvent is less than $750\times10^{-5}$ mJ, selected from a group, including a)
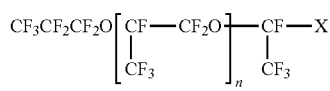

where: n=1-20;
X=—COOH, —CONH$_2$, —CON(C$_6$H$_5$)$_2$, —CH$_2$OH.
b) CF$_3$(CF$_2$)$_n$COOH, where: n=7-9.

c)
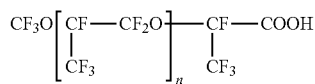

where: n=3-20.

The composition according this invention can comprise additionally functional different additives and mineral and organic fillers according to application requirement, including carbon and oxide nanotubes and fullerene.

The proposed epoxy-rubber composition has prepared by laminar mixing all the components according to following examples.

Example 1

The composition was prepared by laminar mixing:

| | |
|---|---|
| epoxy resin D.E.R.-354LV (Dow Chemical)* | 100 w.p. |
| liquid rubber Hycar 1300X8 CTBN (Emerald Perf. Mat.)** | 18 w.p. |
| isophoronediamine (BASF) | 25.5 w.p. |
| fluorine organic matter (I) | 0.28 w.p. |

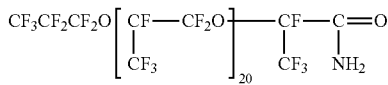

*epoxy resin based on bisphenol F with EEW 167
** carboxyl terminated liquid oligomer with 18% acrylonitrile content, molecular weight 3550 Mn and functionality 1.8.

Example 2

The composition was prepared by laminar mixing:

| | |
|---|---|
| epoxy resin EPON Resin 825 (Hexion.)* | 100 w.p. |
| liquid rubber Poly bd 2000CT (Sartomer)** | 7 w.p. |
| xylelenediamine (Mitsubisi Gas Chemical) | 19 w.p. |
| fluorine organic matter (II) | 0.12 w.p. |

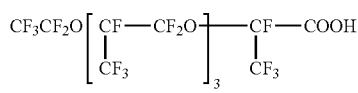

*epoxy resin based on bisphenol A with EEW 179
** carboxyl terminated polybutadiene with molecular weight 2300 and functionality 2.0

Example 3

The composition was prepared by laminar mixing:

| | |
|---|---|
| epoxy resin EPOKUKDO YDF-161 (Kukdo, S. Korea)* | 100 w.p. |
| liquid rubber Poly bd 600E (Sartomer) ** | 25 w.p. |
| hardener UP-587 (UKRNIIPM, Ukraine)*** | 36.4 w.p. |
| fluorine organic matter (III) | 0.48 w.p. |

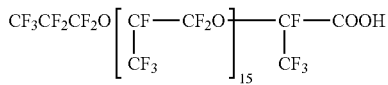

*epoxy resin based on bisphenol A/bisphenol F with EEW 175
** epoxidized hydroxyl terminated polybutadiene with molecular weight 1350 and functionality 2.5 (EEW 460)
***tris-dimetylaminemethylresorcinol

Example 4

The composition was prepared by laminar mixing:

| | |
|---|---|
| epoxy resin EBF-18M (Carboshale, Estonia) * | 100 w.p. |
| liquid rubber PDI-3AK (VHNIICK, Russia) ** | 22 w.p. |
| Isophoronediamine (BASF) | 25 w.p. |
| fluorine organic matter (IV) | 0.73 w.p. |

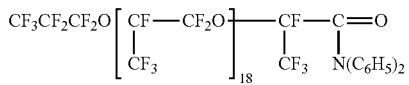

* epoxy resin based on boron contained bisphenol modified by diglycidic ester of gexadimethylcyclohexene with EEW 170
** polydieneurethanediepoxide with molecular weight 2450 and functionality 1.9

Example 5

The composition was prepared by laminar mixing:

| | |
|---|---|
| epoxy resin NPEF-157(Nan Ya, Taivan) * | ...100 w.p. |
| liquid rubber Hucar 1300 X16 ATBN (Emerald Perf. Mat.) ** | ...12 w.p. |
| hardener Dylek A (DuPont Nylon) *** | ...16 w.p. |
| fluorine organic matter (V) | ...0.14 w.p. |
| CF$_3$(CF$_2$)$_n$ COOH | |
| where: n = 7-9 (mixture of homologues) | |

* epoxy resin based on bisphenol A/bisphenol F with EEW 180
** amine terminated liquid rubber with acrylonitrile content 18%, molecular weight 3700 and functionality 1.8
*** 2-methylpentamethylenediamine-1.5

Example 6

The composition was prepared by laminar mixing:

| | |
|---|---|
| epoxy resin Epotuf 37-138 (Reichhold Chemicals) * | 100 w.p. |
| liquid rubber KR-207(Kukdo, S. Korea)** | 22 w.p. |
| xylelenediamine (Mitsubisi Gas Chemical) | 23.2 w.p. |
| fluorine organic matter (VI) | 0.63 w.p. |

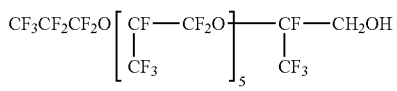

* epoxy novolac resin with EEW 175
**CTBN rubber adduct with TGE TMP with EEW 195

Example 7

The composition was prepared by laminar mixing:

| | |
|---|---|
| epoxy resin D.E.R. 364 (Dow Chemicals) * | 100 w.p. |
| liquid rubber Tiokol LP-3 (Morton Thiokol) ** | 14 w.p. |
| xylelenediamine (Mitsubisi Gas Chemical) | 16 w.p. |
| fluorine organic matter (VII) | 0.96 w.p. |

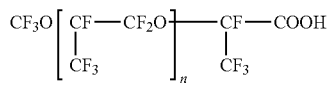

where: n = 10-12 (mixture of homologues)

\* epoxy resin based on bisphenol A with EEW 200
\*\* polysulphide liquid rubber with molecular weight 1015 and mercaptan content 6.7%

Example 8

The composition was prepared by laminar mixing:

| | |
|---|---|
| epoxy resin Dekalit-6 (NIIPM, Russia) * | 100 w.p. |
| liquid rubber KR-207 (Kukdo, S. Korea)** | 6.5 w.p. |
| hardener EC-KG (Macromer, Russia) *** | 29.5 w.p. |
| fluorine organic matter (VIII) | 0.42 w.p. |

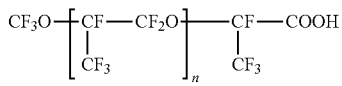

where: n = 3-7 (mixture of homologues)

\* epoxy silicone-organic resin with EEM 198
\*\*CTBN rubber adduct with TGE TMP with EEW 195
\*\*\* eutectic mixture of polymetaphenilendiamine with salicylic acid

Example 9

The composition was prepared by laminar mixing:

| | |
|---|---|
| epoxy resin Polypox E 150 (UPPC, Germany) * | 100 w.p. |
| liquid rubber 1300X31CTBN (Emerald Pelf. Mat.) ** | 4.5 w.p. |
| hardender Polypox P 450 S (UPPC, Germany) *** | 52.3 w.p. |
| flourine organic matter (IX) | 0.18 w.p. |

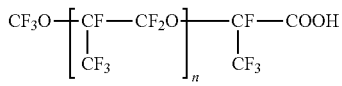

where: n = 18-20 (mixture of homologues)

\* epoxy resin based on hydrogenated bisphenol A with EEW 220
\*\* carboxyl terminated liquid rubber (copolymer butadiene and acrylonitrile) with molecular weight 3800 Mn, functionality 1.9
\*\*\* polyaminoimidozoline with H-equivalent 115 and amine number 285 g/equiv.

Adding the proposed fluorine organic matter in all the epoxy-rubber composition significantly increased their mechanical properties. The data of testing compositions according the examples I-IX is shown in the table.

TABLE 1

| Type of composition | * | ** | *** |
|---|---|---|---|
| According example 1 | 84.8 | 21.5 | 22.7 |
| According example 1, but without fluorine matter I | 61.9 | 14.2 | 14.7 |
| According example 2 | 77.4 | 19.6 | 20.8 |
| According example 2, but without fluorine matter II | 58.3 | 10.1 | 12.9 |
| According example 3 | 74.2 | 22.9 | 25.8 |
| According example 3, but without fluorine matter III | 52.6 | 15.2 | 17.9 |
| According example 4 | 81.8 | 22.9 | 26.4 |
| According example 4, but without fluorine matter IV | 64.4 | 10.8 | 15.1 |
| According example 5 | 93.8 | 25.7 | 30.4 |
| According example 5, but without fluorine matter V | 71.7 | 11.8 | 18.3 |
| According example 6 | 71.9 | 22.5 | 27.6 |
| According example 6, but without fluorine matter VI | 58.2 | 14.9 | 18.2 |
| According example 7 | 74.2 | 21.8 | 27.2 |
| According example 7, but without fluorine matter VII | 55.4 | 15.5 | 17.7 |
| According example 8 | 81.0 | 20.4 | 21.6 |
| According example 8, but without fluorine matter VIII | 57.3 | 8.7 | 10.7 |
| According example 9 | 63.5 | 28.9 | 29.6 |
| According example 9, but without fluorine matter IX | 50.6 | 18.2 | 19.4 |

\* Tensile strength, MPA
\*\* Tensile elongation, %
\*\*\* Impact strength, kJ/m According the data of table 1 proposed compositions have significant advantages in comparing with conventional composition.

The invention claimed is:

1. An epoxy rubber composition, comprising:
   an epoxy resin having an epoxy compound with epoxy equivalent weight from 150 to 200 and viscosity from 2,000 to 10,000 cps (25 C);
   a curing agent;
   a fluid rubber that is liquid at room temperature and has at least 1.5 reactive terminated groups, wherein said rubber is a low molecular weight liquid rubber selected from the group consisting of butadiene, butadiene-acrylonitrile, butadiene-styrene, and butadiene-isoprene; and
   a fluorine containing organic matter selected from the group consisting of:

a)
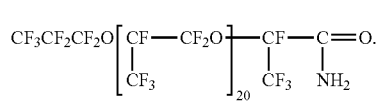

b)
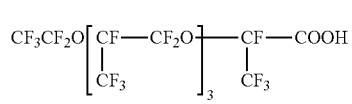

c)
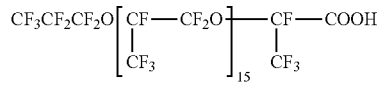

d)
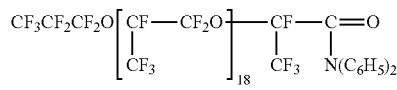

-continued

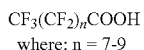
where: n = 7-9

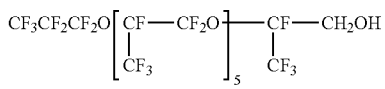

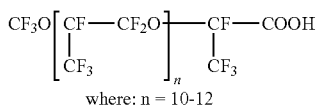
where: n = 10-12

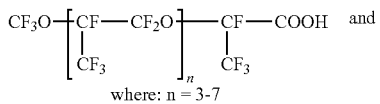 and
where: n = 3-7

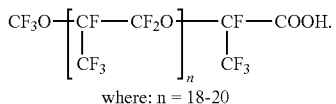
where: n = 18-20

2. The epoxy rubber composition as defined in claim 1, wherein it contains 0.1-1.0 parts of said fluorine containing organic matter per 100 parts of said epoxy compound with a ratio of said epoxy compound to said liquid rubber being 100/1.5-28.

3. The epoxy rubber composition as defined in claim 1, further comprising epoxy resin low molecular oligomers with at least two terminated epoxy groups selected from the group consisting of glycidic ethers of bisphenol A, bisphenol F, other bisphenols, alkylresorcinols, novolac low molecular resins, acrylic low molecular resins, and their mixtures with aliphatic glycidic ethers.

4. The epoxy rubber composition as defined in claim 1, wherein said curing agents are primary amines with at least two terminated primary amine groups, or Mannich bases, or organic matter with at least two terminated carboxylic anhydrate groups.

* * * * *